UNITED STATES PATENT OFFICE.

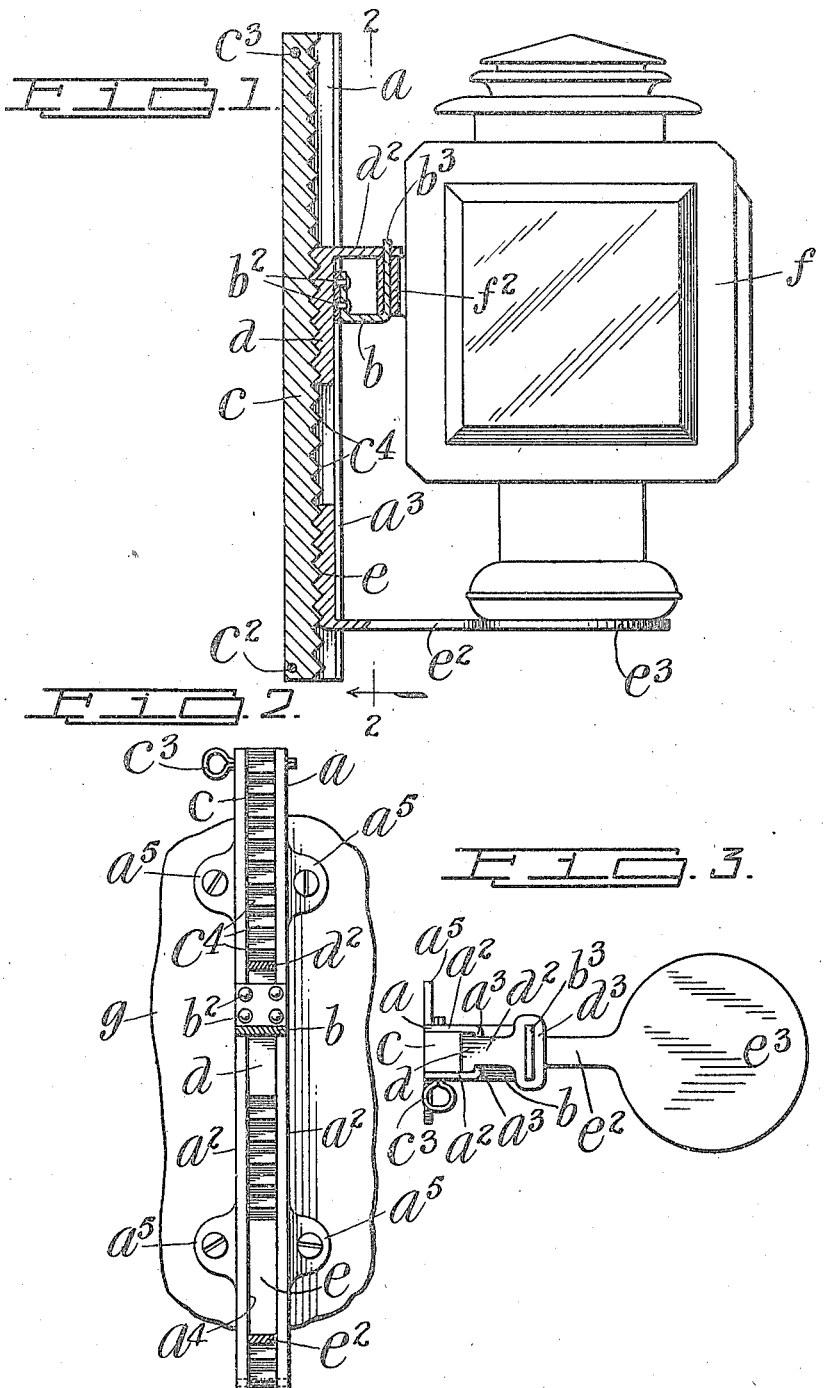

GEORGE H. GUMBEL, OF BROOKLYN, NEW YORK.

LAMP-BRACKET.

1,136,005. Specification of Letters Patent. Patented Apr. 20, 1915.

Application filed July 16, 1914. Serial No. 851,248.

*To all whom it may concern:*

Be it known that I, GEORGE H. GUMBEL, a citizen of the United States, and residing at Brooklyn, in the county of Kings and State of New York, have invented certain new and useful Improvements in Lamp-Brackets, of which the following is a specification, such as will enable those skilled in the art to which it appertains to make and use the same.

This invention relates to lamp brackets or supports, and the object thereof is to provide an improved device of this class designed particularly for use in connection with automobiles or other vehicles, and by means of which a lamp of the class used in connection with said vehicles may be quickly and easily connected therewith and securely held against displacement; a further object being to provide a lamp bracket or support of the class specified which is simple in construction and operation, convenient of manipulation and easy of attachment.

The invention is fully disclosed in the following specification, of which the accompanying drawing forms a part, in which the separate parts of my improvement are designated by suitable reference characters in each of the views, and in which :—

Figure 1 is a sectional side view of my improved lamp bracket and showing a lamp connected therewith; Fig. 2 a section on the line 2—2 of Fig. 1 and showing the bracket attached to a support; and, Fig. 3 a plan view of the bracket detached.

In the practice of my invention, as shown in the drawing, I provide an oblong body member $a$ consisting of two similar parallel plates $a^2$ provided at their front edges with inwardly directed flanges $a^3$, and the side plate members $a^2$ are connected by an arm member $b$ in the form of a U-shaped bracket riveted or otherwise secured to the flange members $a^3$ as shown at $b^2$, but my invention is not limited to any particular means for securing the plate members $a^2$ together. I also provide a rack bar $c$ which fits in and is movable into and out of the back portion of the body member $a$ and is pivoted in one end of said body member as shown at $c^2$, and is held in the other end of said body member by a key pin $c^3$ passed therethrough and through the side plates $a^2$ of said body member.

The rack bar $c$ is provided on its front edge with teeth $c^4$, and mounted between said rack bar and the front flanges $a^3$ of the side plates $a^2$ are two vertically adjustable blocks $d$ and $e$, each of which is provided with teeth which correspond with the teeth $c^4$ of the rack bar $c$, and the bottom block $e$ is provided with an arm $e^2$ which extends forwardly through the slot $a^4$ between the front edges of the plate members $a^2$ and which is provided with a head $e^3$ adapted to support a lamp $f$ as shown in Fig. 1, and the back of the lamp $f$ is provided with a bracket loop $f^2$ or similar device adapted to engage the outer arm $b^3$ of the U-shaped bracket or arm member $b$, and the block $d$ is provided with an arm $d^2$ which passes forwardly through the slot $a^4$ and is provided with a transverse link-shaped head $d^3$ also adapted to engage the arm $b^3$ of the bracket or arm member $b$, all as clearly shown in Fig. 1.

With this construction, it will be understood that by removing the key pin $c^3$ the rack bar $c$ may be moved outwardly and the block $e$ may be adjusted into any desired position with reference to the bracket $b$ after which the lamp is placed in position, and the block $d$ moved into the position shown in Fig. 1, after which the rack bar $c$ is moved into position, as shown in said figure, and secured therein.

The body member $a$ of my improved lamp bracket is provided with side ears $a^5$ whereby it may be secured to a support $g$ which may consist of any part of the frame of the vehicle, or the said bracket may be secured to any kind or class of a support.

My invention is not limited to any particular means for manipulating the rack bar $c$ or holding it in place, nor to the exact means herein shown and described, for adjusting the members $d$ and $e$, nor to the form of said members, and changes in and modifications of the construction herein described may be made, within the scope of the appended claims, without departing from the spirit of my invention, or sacrificing its advantages.

Having fully described my invention, what I claim as new and desire to secure by Letters Patent, is:—

1. A lamp bracket, comprising a body part having a straight front face provided with transverse serrations, side plates pivoted to one end of said body part and projecting forwardly of said face and having inwardly directed flanges, said side plates being adapted to be secured to the other end of said body, two blocks mounted between said side plates and provided on their back surfaces with transverse serrations corresponding with the serrations on the body part, said blocks being provided with forwardly directed arms, and an angular arm secured to the flanges of said side plates and having an upwardly directed member in connection with which the arm of one of said blocks operates.

2. A lamp bracket, comprising an oblong body part one side of which is provided with an outwardly directed arm which is secured thereto, two vertically adjustable devices mounted in the body part one above the other and provided with outwardly directed arms, the arm which is connected with the bottom device being adapted to support a lamp having a member adapted to engage the arm which is secured to the body part and the arm of the upper vertically adjustable device being also adapted to engage the arm secured to the body part.

In testimony that I claim the foregoing as my invention I have signed my name in presence of the subscribing witnesses this 14th day of July 1914.

GEORGE H. GUMBEL.

Witnesses:
C. MULREANY,
H. E. THOMPSON.